United States Patent
Patrick

Patent Number: 5,657,967
Date of Patent: Aug. 19, 1997

[54] ECOLOGICAL CONFINEMENT OPTION

[76] Inventor: Thomas D. Patrick, P.O. Box 2384, Sun City, Ariz. 85383

[21] Appl. No.: 513,577

[22] Filed: Aug. 10, 1995

Related U.S. Application Data

[62] Division of Ser. No. 230,977, Apr. 21, 1994, abandoned.

[51] Int. Cl.$^6$ ............................................. E04H 17/16
[52] U.S. Cl. ............................ 256/19; 256/24; 256/65; 256/69
[58] Field of Search ................... 256/19, 24, 21, 256/22, 59, 65, 67–73, 68–69

[56] References Cited

U.S. PATENT DOCUMENTS

| | | | |
|---|---|---|---|
| 1,643,555 | 9/1927 | Gledhill | 256/24 X |
| 2,642,269 | 6/1953 | Daniel | 256/24 X |
| 2,895,170 | 7/1959 | Carlile | 264/151 |
| 3,136,530 | 6/1964 | Case | 256/24 |
| 3,395,489 | 8/1968 | Banse | 256/24 X |
| 3,801,072 | 4/1974 | Newberry, Jr. | 256/19 |
| 3,877,140 | 4/1975 | Topolsek | 256/19 X |
| 3,899,561 | 8/1975 | Heilmayr | 264/151 |
| 3,910,561 | 10/1975 | Fornells | 256/19 X |
| 3,960,367 | 6/1976 | Rogers | 256/21 |
| 4,124,198 | 11/1978 | Wong | 256/24 |
| 4,187,352 | 2/1980 | Klobbie | 264/323 |
| 4,357,000 | 11/1982 | Tisbo et al. | 256/26 |
| 4,369,953 | 1/1983 | Greiner et al. | 256/24 |
| 5,078,367 | 1/1992 | Simpson et al. | 256/24 |
| 5,088,910 | 2/1992 | Goforth et al. | 264/148 |
| 5,100,107 | 3/1992 | Latta | 256/19 |
| 5,215,290 | 6/1993 | Khalessi | 256/19 |
| 5,217,655 | 6/1993 | Schmidt | 264/37 |
| 5,255,897 | 10/1993 | Pepper | 256/24 |
| 5,277,408 | 1/1994 | Parker | 256/59 X |
| 5,320,794 | 6/1994 | Holmes | 264/148 |
| 5,400,555 | 3/1995 | Kantor | 256/67 X |
| 5,441,240 | 8/1995 | Arnold | 256/19 X |

*Primary Examiner*—Harry C. Kim

[57] ABSTRACT

A fence system having treated wooden posts set in concrete at spaced-apart locations. Galvanized metal stringers extend between the posts and engage the post at a mounting surface. The mounting surface defines a plurality of vertically-elongate slots through which fasteners extend. Pickets are secured to the stringers and are vertically oriented. The stringers are secured by fasteners such as screws. Preferably the stringers are formed from HDPE and expansion and contraction of the pickets is accommodated by the slots in the mounting faces of the stringers. The pickets are formed by grinding waste plastic and adding UV inhibitors and color if desired. The ground plastic material is extruded under heat and pressure and the desired surface treatment applied to simulate the appearance of natural wood fencing. The surface-treated extrusion is cut to the desired length to form individual pickets.

14 Claims, 3 Drawing Sheets

ECOLOGICAL CONFINEMENT OPTION

This is a divisional of application Ser. No. 08/230,977, filed date Apr. 21, 1994, now abandoned.

FIELD OF THE INVENTION

The present invention relates to fencing materials and methods of construction. More particularly, the present invention relates to fences which utilize panels or pickets made of synthetic materials that attach to a wooden post using metal stringers.

BACKGROUND OF THE INVENTION

Various construction materials are used in the construction of decorative and utilitarian fencing. Commonly, wooden fencing is fabricated on site using materials such as cedar, redwood, pine and the like. These fences are constructed by installing posts at spaced-apart intervals, usually set in cement. Horizontal stringers extend between the posts and vertical members in the form of individual pickets or, in some cases pre-constructed panels, are attached to the horizontal stringers. If the vertical members are placed on only one side of the stringers, the fence is a single-sided fence and placement of stringers or panels on both sides of the stringers results in a double-sided fence for improved appearance from either side.

Wooden fences as constructed above are popular because of their appearance and because of general ease of construction. However, in recent years, because of demand and environmental concerns, the cost of wooden fencing materials has risen significantly making these fences expensive. In addition, fences fabricated from wood require periodic maintenance such as painting or application of preservatives or oils.

Another common fencing material is the use of galvanized pipe and wire which systems are popularly termed "cyclone" fencing. Such fencing is primarily used for commercial and industrial applications inasmuch as fencing of this type is not particularly aesthetically appealing.

Block fencing is another popular alternative, particularly in certain parts of the country such as the Southwest. Block fencing construction techniques involve placing a concrete footing including reinforcing at spaced intervals. The block fence is constructed by placing the blocks one at a time in sequential horizontal rows using mortar. Some cement block systems utilize pillars at spaced-apart locations which pillars are formed from blocks mortared in place. Interlocking blocks are used to form the horizontal tiers between the pillars.

While block fences have the advantage of requiring little or no maintenance, block fences are expensive as substantial labor is required to construct the fences. In addition, block fences may be objectionable in hotter climates inasmuch as block will absorb heat throughout the day and radiate heat at night.

Accordingly, fencing contractors have looked to other materials to provide inexpensive yet durable and aesthetically acceptable fencing. Such materials include synthetic materials.

Various fence constructions using synthetic materials can be found in the prior art. For example, U.S. Pat. No. 3,801,072 discloses a fence having the appearance of a picket fence molded from fiberglass. The panels are supported between conventional fence posts to form a fence of synthetic material having the physical appearance of a conventional fence.

U.S. Pat. No. 5,215,290 shows an improved fence made of plastic materials comprising four parts. A central post, removable cap for the post, fence portions and adaptor portions for connecting fence portions with the central post. The adaptor portions have bolt holes oriented in three directions to provide a securing arrangement for the fencing post sections.

U.S. Pat. No. 4,124,198 shows a plastic fence comprising interconnectable post sections including a base post section anchored in the ground and one or more shorter post sections to provide a fence of any desired height. The post sections may be removably interconnected by a screw connection or a bayonet-type connection. In one embodiment, individual struts horizontally connect between spaced post sections while in another embodiment panel means connect therebetween.

U.S. Pat. No. 4,357,000 relates to an integrally molded plastic fence section. Each section is locked to an adjacent section to make up a continuous fence. A plurality of pickets is formed integrally with the stringers. One end of each of the stringers has spaced ears having apertures. The apertures and the ears on one end of a stringer align with the apertures on the other when the fence is assembled.

While the foregoing patents show various fence arrangements utilizing plastic or synthetic materials, none deal with the problem of expansion which occurs in fence pickets made from certain synthetics such as high density polyethylene (HDPE). For example, high density polyethylene has a mind of its own. When the temperature fluctuates 50° F. or so in a twenty-four hour period, this material expands about ¼" per 8' section. This high rate of expansion has precluded the use of HDPE in most fence applications because expansion eventually causes mechanical fasteners applied between the posts and stringers to tear out. Nails and screws will back out in time weakening the fence and causing components to loosen. Expansion also causes fences to warp and bow creating an unsightly appearance.

SUMMARY OF THE INVENTION

The present invention provides a fencing system which simulates the appearance of fences made of wood and which fence system may be easily fabricated utilizing pickets of synthetic material which have the appearance of natural wood grain. Synthetic pickets are environmentally resistant and do not deteriorate nor require painting or other surface treatment. Further, synthetic material is graffiti-resistant with usual clean up of soap and water. Occasional light sanding may be done on affected areas. Another advantage is that utilization of fence materials of synthetics do not retain heat as do masonry fences. Further, the pickets can be placed so that air circulates between the pickets still providing security and privacy.

Briefly, in accordance with the present invention, a fence system is provided in which the vertical fence members or pickets are fabricated from high density polyethylene (HDPE) post-industrial recycling waste. This material is primarily the product of ground waste material from readily available sources such as polyethylene milk and beverage containers. The individual pickets are formed in an extrusion process and a wheel-press or similar device embosses the desired wood grain effect in the surface of the extrusion. Colorants and UV inhibitors are added to the waste material processed by extrusion. After extrusion and embossing the pickets are cut to the desired length.

In the construction of the fence, posts are positioned at spaced-apart locations. The posts are preferably CCA water-treated wood which are guaranteed by manufacturers to have a life time of 20 years. The posts are set in concrete and are interconnected by vertically spaced-apart horizontal galvanized steel stringers. The stringers are C-shaped or open-box shaped in cross section and the ends of the stringers are undercut or formed having a steel attachment plate at the point of attachment to a post. The attachment plates are provided with vertically elongate slots to accept fasteners, preferably wood screws which are inserted through the attachment plates into the posts securing the stringers at the elongate slots. The pickets are vertically secured to the stringers by conventional fasteners such as galvanized cone-head sheet metal screws. The pickets may be abutted but are preferably spaced-apart so that a small gap exists between the pickets to allow air circulation and still maintain security and privacy. Gates may be placed at predetermined locations and the gates are constructed as described above and secured by conventional hinge arrangements.

If the fence is a single-sided fence, the exposed sides of the stringers may be enclosed with a generally C-shaped galvanized track member for aesthetic and safety purposes. Thus, it is the primary object of the present invention to provide a fence utilizing recycled plastic materials which fence has the general appearance of a conventional wood picket fence but which is maintenance free and has an extremely long life and which fence is provided with mechanical connections which accommodate the natural tendency of the synthetic pickets to expand.

BRIEF DESCRIPTION OF THE DRAWINGS

The above and other advantages and features of the present invention will become more readily apparent when taken in conjunction with the specification, appended claims and attached drawings in which:

DESCRIPTION OF THE PREFERRED EMBODIMENT

Figure 1:
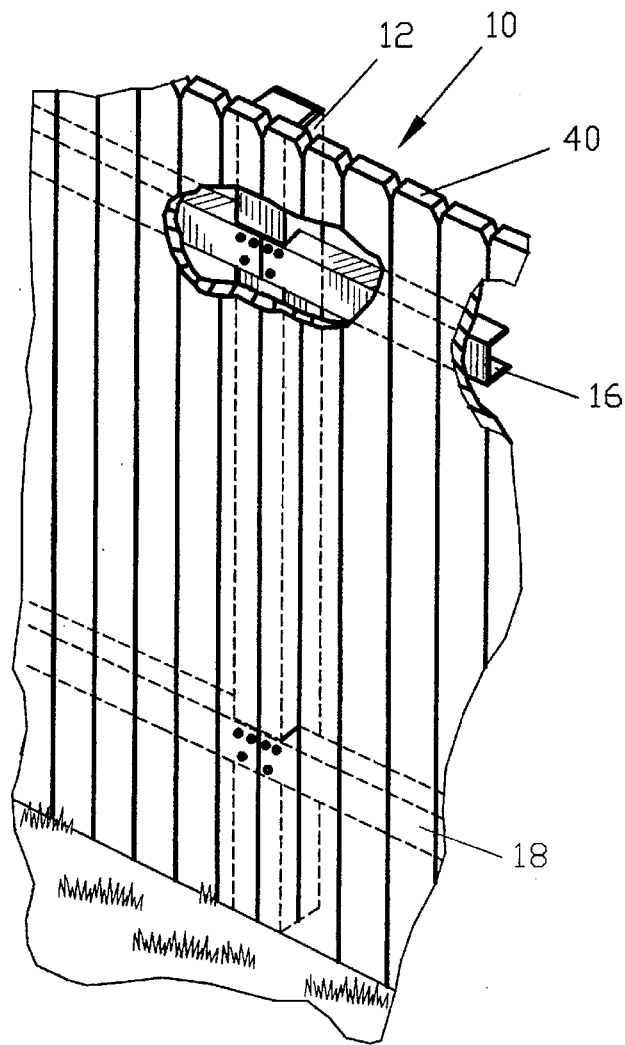
FIG. 1 is an elevational view of a section of a fence constructed in accordance with the present invention.
Figure 2:
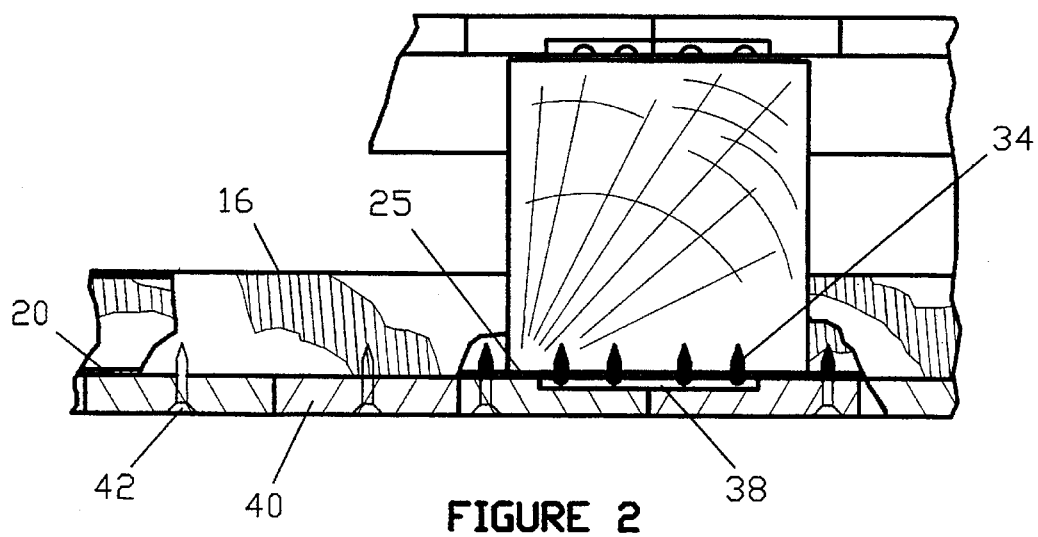
FIG. 2 is a detail view of the interconnection of the stringers to a post.
Figure 3:
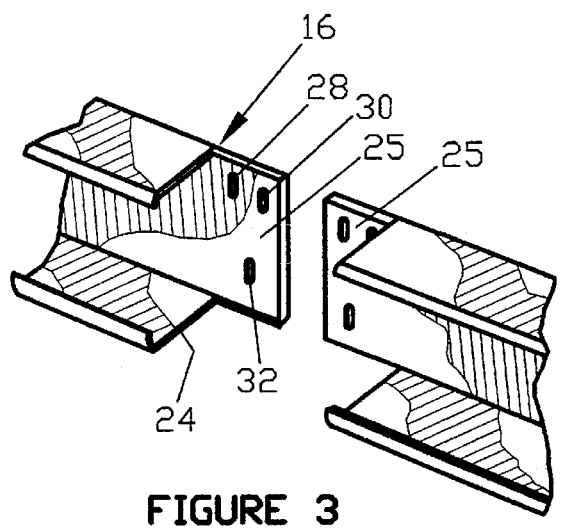
FIG. 3 is a perspective view showing the ends of adjacent stringers.
Figure 4:
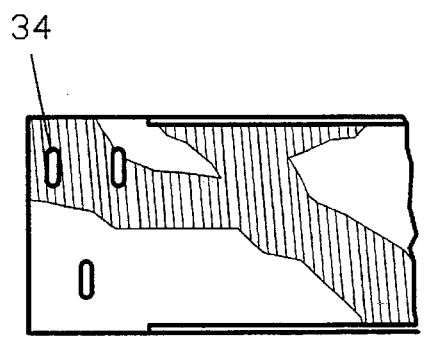
FIG. 4 is an elevational view of the end of a stringer.

The fence system in accordance with the present invention is shown in FIGS. 1 to 7 and is generally designated by the numeral 10. The fence system simulates the appearance of a conventional wood picket fence and has a plurality of vertically spaced-apart posts 12. Posts 12 are preferably 4×4's or are similarly dimensioned and are of a suitable material such as CCA water treated posts. Posts of this type are generally guaranteed by the manufacturer to have a useful life of at least 20 years. The posts are spaced apart at intervals of typically 6' to 8' and the posts are individually set in the ground in cement as is conventional. The posts are interconnected by upper stringer 16 and lower stringer 18. An intermediate stringer may also be included but is not shown. The stringers are identical and are preferably fabricated from 16 or 20 gauge galvanized steel and are each formed having a vertical face 20 and upper flange 22 and lower flange 24 forming a general C-shape or box-shape. The stringers can be provided in various lengths and cut to fit in the field. In fitting, the stringers are cut so the length of the stringer approximately corresponds to the centerline distance between adjacent posts. Upper and lower flanges 22 and 24 are cut away at the ends of the stringers as best shown in FIGS. 1, 2 and 3 so that the stringer flanges snugly fit between adjacent posts. A section 25 of the face 20 of the stringer abuts the vertical outer face of the post. Each section 25 of the stringer abutting the post is provided with a plurality of vertically oriented slots, three are shown as indicated by numerals 28, 30 and 32. The slots may be variously positioned but are preferably arranged with slots 28 and 30 horizontally aligned and are positioned so that they are each approximately ¼" to ½" inwardly from the adjacent vertical edge of the post. A third slot 32 is positioned beneath the upper two slots at a location approximately centered between the upper two slots. The slots may be variously dimensioned but for most applications will be ⅛" to ⅜" in width and from approximately ¼" to ½" in length. The stringers are secured to the posts by screws 34 such as No. 10 wood screws extending through the plate section 25 and into the posts at the upper ends of the slots. The screws are preferably of the type having a tapered head and when applied are tightened leaving a small clearance between the head and the face of section 25 of the stringer. The pickets may be undercut at the posts in area 38 to provide clearance for the heads of screws 34. A typical clearance would be 1/32". A clearance may be provided between adjacent stringers.

Top and bottom stringers 16 and 18 are similarly attached to each post as well as an intermediate stringer, if necessary. The posts and stringers are installed in this manner in the area to be enclosed by the fence to complete the picket support assembly.

When the posts 12 and stringers 16, 18 have been properly installed, vertical pickets 40 are secured to the vertical faces of the stringers. The pickets may be of any suitable dimension but typically are approximately 2" to 4" wide and up to 8' in length. As mentioned above, the pickets are made from high density polyethylene post industrial recycled waste. The pickets have the appearance of natural wood but with improved characteristics which resist the environment and which require little or no maintenance. The pickets are secured to the stringers vertically by the use of metal screws 42 extending through the picket into the stringers. The pickets may be pre-drilled with holes at predetermined locations for this purpose. The individual pickets 40 may be abutted as shown or may be positioned with a small clearance or gap between the pickets. The gap allows some circulation of air through the fence yet still maintains the desired security and privacy.

Figure 6:
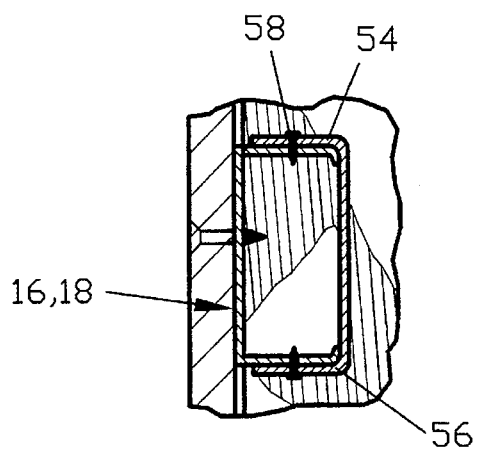
FIG. 6 is a partial sectional view showing a single-sided fence.
Figure 7:
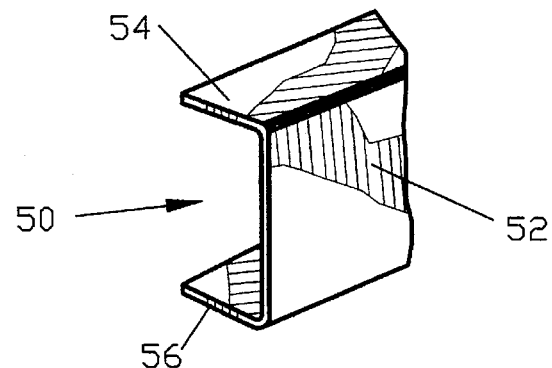
FIG. 7 is a perspective view of a portion of a stringer cap.
Figure 8:
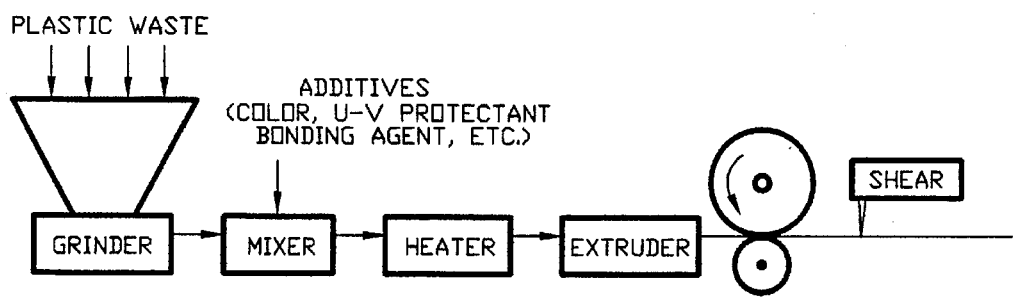
FIG. 8 is a pictorial representation of the fabrication method.

The fence construction, if a single-sided fence, is completed by insertion of a cover 50 inserted to enclose the open side of the stringers, as seen in FIGS. 6 and 7. The cover 50 has a vertical face 52 and oppositely disposed flanges 54 and 56. The cover is cut to a length corresponding to the distance between the faces of adjacent posts. The cover is inserted onto the stringers so that the flanges 54, 56 engage the flanges 22, 24 of the stringers 16 and 18. The cover is held in place by oppositely disposed sheet metal fasteners shown as sheet metal screws 58. The cover is provided both as a safety feature and to enhance the appearance of the fence.

Figure 5:
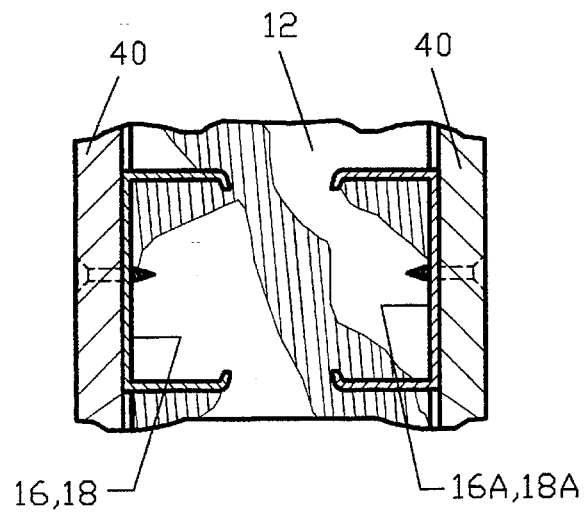
FIG. 5 is a partial sectional view showing a double-sided fence.

In the event the fence is a double-sided fence, the covers 50 may be omitted and another set of lower stringers 16A, 18A positioned on the opposite face of the posts 12 with the construction being completed by the application of vertical pickets 40A to the stringers. The stringers, in this event, are secured to both sides of the post in a manner as described above. This construction is shown in FIG. 5.

As has been previously mentioned, synthetic materials such as HDPE often have the characteristics of substantial expansion and contraction with temperature changes. For example, HDPE pickets 8' in length may expand ¼" or so in length per section. Previously the expansion has rendered the use of HDPE materials impractical in fence construction due to the fact that warpage occurs and fasteners will work loose or be torn loose due to the linear expansion. However, HDPE materials, particularly those utilizing post-industrial recycled waste, are desirable for such applications for economic and ecological reasons and also because of durability and ease of maintenance. With the present system, the vertical expansion of the pickets is accommodated at the slots positioned at section 25 at the ends of the stringers. Thus, the entire stringers can vertically expand and retract without affecting the fasteners and without causing bowing or warpage of the fence.

Figure 9:
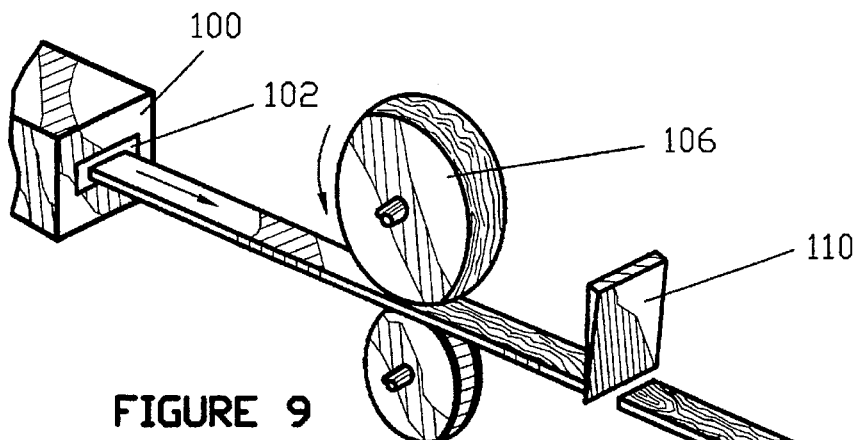
FIG. 9 shows the embossing and cutting of pickets.
Figure 10:
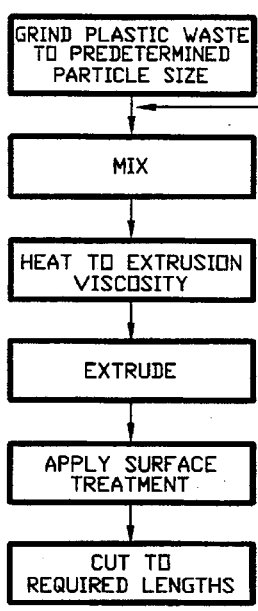
FIG. 10 is a flow chart illustrating the steps in the method of fabrication of the fence pickets used in the fencing system of the present invention.

The steps involved in the construction of the individual pickets is shown in FIGS. 9 and 10. The pickets are fabricated from a high density polyethylene post-industrial recycled waste material which is first cleaned and then ground to the desired particle size. The waste material, along with suitable coloring agents and additives such as UV inhibitors, are placed in a conventional extrusion device as is well known in the art. The extrusion device heats and plasticizes the material and forces it under pressure through an extrusion die of the desired shape. The material is discharged in continuous form as an extrusion from the extrusion device 100 in the desired shape as for example a picket having a rectangular cross sectional shape approximately 1"×4". The extrusion, as it exits the extrusion die 102, is at an elevated temperature and the material is somewhat soft. Accordingly, a wheel press 106 will emboss the desired surface effect such as gaining in the opposite faces of the picket. Thereafter, pickets 40 of the desired length as for example 6' or 8' are individually sheared at shear 110 from the extruded and embossed material.

Figure 11:
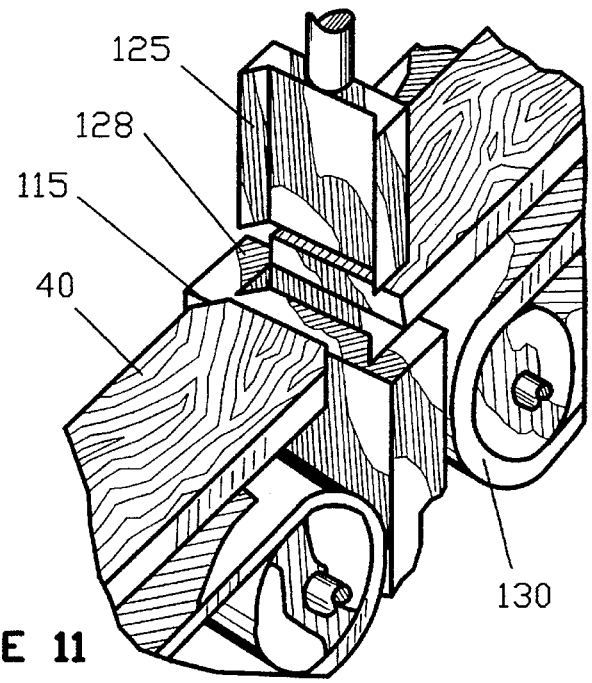
FIG. 11 is a detail view of a cutting die.

In FIG. 11 a shear 125 is shown in which the pickets 40 are cut having a dog ear configuration 115 at one end of the picket. This is accomplished by shear 125 which imparts anvil 128 as the extrusion passes along conveyor 130.

It will be appreciated that fences constructed as described above are much more durable than wooden fences or other fences of conventional materials. A substantial ecological advantage results in that waste materials which are in plentiful supply are utilized. Another substantial advantage is that a fence in accordance with the present invention is easily cleaned, thus graffiti may be easily removed from the surface of the polyethylene material as most paint substances do not readily adhere to this material.

Another advantage is the fence system of the present invention is easy to repair. In the event of damage, sections of the fence can be easily removed and replaced. If necessary, the stringers can be reversed which would result in the slots in the picket ends being positioned at locations where screws extending into the post would be in new locations and which do not use existing holes which generally result in better affixation or purchase.

While the principles of the invention have been made clear in the illustrative embodiments set forth above, it will be obvious to those skilled in the art to make various modifications to the structure, arrangement, proportion, elements, materials and components used in the practice of the invention. To the extent that these various modifications do not depart from the spirit and scope of the appended claims, they are intended to be encompassed therein.

I claim:

1. A fence system comprising:

at least one vertical treated wooden post;

at least two C-shaped galvanized steel expansion stringers, each of said stringers comprising a central portion with upper and lower flanges extending therefrom, said each stringer having an end portion with a plurality of vertically oriented elongated slots thereon, each of said end portions being defined by said central portion of the respective stringer with said upper and lower flanges removed therefrom, said each end portion having a first face and a second face opposite the first face wherein the first face abuts a surface of the post, said end portions of the respective stringers being disposed adjacent to each other and being secured to said surface of said post by screws having tapered heads, said screws extending into said post through said slots of the respective end portion and forming a small clearance between each of said screw heads and said second face of the respective end portion; and a plurality of treated high density polyethylene plastic pickets, each of said pickets having a surface for abutting and attaching to the central portions of said at least two expansion stringers, at least one of said pickets having said surface with an undercut formed thereon, said undercut of said at least one picket overlaying said slots of one of said end portions and providing clearance for the heads of the respective screws extending through said slots of said one end portion, wherein said vertically oriented elongated slots, said small clearance between the screw heads and the second faces of the respective end portions, and said undercut of said at least one picket are provided to accommodate vertical thermal expansion of said plastic pickets attached to said expansion stringers.

2. The fence system of claim 1, further including a plurality of safety cover track members for attaching to said expansion stringers.

3. The fence system of claim 2, wherein said safety cover track members are attached to said stringers by a plurality of fastening means.

4. The fence system of claim 1, wherein said plastic pickets are treated to resist ultra violet degradation and discoloration.

5. The fence system of claim 1, wherein said plastic pickets are treated to resist application of paint thereon.

6. The fence system of claim 1, wherein said plastic pickets simulate wooden pickets.

7. The fence system of claim 1, wherein said plastic pickets are colored.

8. The fence system of claim 1, wherein each of said plastic pickets is four inches wide and at least one half inch thick.

9. The fence system of claim 1, wherein each of said plastic pickets is generally six to eight feet long.

10. The fence system of claim 1, wherein said plastic pickets are attached to said stringers by self drilling taperhead screws.

11. The fence system of claim 1, wherein each of said plastic pickets has a mitered top.

12. The fence system of claim 1, wherein said plurality of slots consists of three elongated slots arranged in a triangular formation.

13. The fence system of claim 1, wherein each of said elongated slots is at least one half inch long and at least one quarter inch wide.

14. The fence system of claim 1, wherein said fence system further comprises another at least two C-shaped galvanized steel expansion stringers having respective end portions for attaching onto the post and another plurality of treated high density polyethylene plastic pickets attached to said other stringers to form a double sided fence assembly.

* * * * *